US011855317B2

(12) United States Patent
Erbach

(10) Patent No.: US 11,855,317 B2
(45) Date of Patent: Dec. 26, 2023

(54) METHOD FOR SHUTTING DOWN A FUEL CELL SYSTEM

(71) Applicant: cellcentric GmbH & Co. KG, Kirchheim / Teck-Nabern (DE)

(72) Inventor: Simon Erbach, Frankfurt (DE)

(73) Assignee: cellcentric GmbH & Co. KG, Kirchheim / Teck-Nabern (DE)

( * ) Notice: Subject to any disclaimer, the term of this patent is extended or adjusted under 35 U.S.C. 154(b) by 204 days.

(21) Appl. No.: 17/432,571

(22) PCT Filed: Feb. 11, 2020

(86) PCT No.: PCT/EP2020/053489
§ 371 (c)(1),
(2) Date: Aug. 20, 2021

(87) PCT Pub. No.: WO2020/173698
PCT Pub. Date: Sep. 3, 2020

(65) Prior Publication Data
US 2022/0140367 A1    May 5, 2022

(30) Foreign Application Priority Data
Feb. 27, 2019   (DE) ..................... 10 2019 001 388.3

(51) Int. Cl.
*H01M 8/04*       (2016.01)
*H01M 8/04228*    (2016.01)
(Continued)

(52) U.S. Cl.
CPC ..... *H01M 8/04228* (2016.02); *H01M 8/0432* (2013.01); *H01M 8/0447* (2013.01);
(Continued)

(58) Field of Classification Search
CPC ......... H01M 8/04228; H01M 8/04089; H01M 8/0432; H01M 8/04462; H01M 8/0447;
(Continued)

(56) References Cited

U.S. PATENT DOCUMENTS

| 10,439,238 B2 | 10/2019 | Riley et al. |
| 2007/0154742 A1* | 7/2007 | Tang ................ H01M 8/04228 |
| | | 429/429 |
| 2008/0003465 A1 | 1/2008 | Yu et al. |
| 2008/0145716 A1 | 6/2008 | Yu et al. |

(Continued)

FOREIGN PATENT DOCUMENTS

| DE | 102005038927 A1 | 3/2006 |
| DE | 102007059999 A1 | 7/2008 |

(Continued)

OTHER PUBLICATIONS

International Search Report dated Apr. 24, 2020, in International Application No. PCT/EP20201053489.

*Primary Examiner* — James M Erwin
(74) *Attorney, Agent, or Firm* — Patent Central LLC; Stephan A. Pendorf

(57) ABSTRACT

A method for shutting down a fuel cell system (2) having at least one fuel cell (3), which fuel cell comprises an anode chamber (10) and a cathode chamber (6), wherein after the shut-down hydrogen remains in the anode chamber (10) of the fuel cell (3) in order to prevent carbon corrosion and to ensure a hydrogen protection time. The invention is characterized in that when the hydrogen in the anode chamber (10) is largely used up directly or after a specified number of subsequent meterings of hydrogen at least into the anode chamber (10), the hydrogen protection time is actively terminated by air being actively admitted into the cathode chamber (6), the fuel cell (3) being actively cooled before air is actively admitted into the cathode chamber (6).

13 Claims, 3 Drawing Sheets

Figure 1:
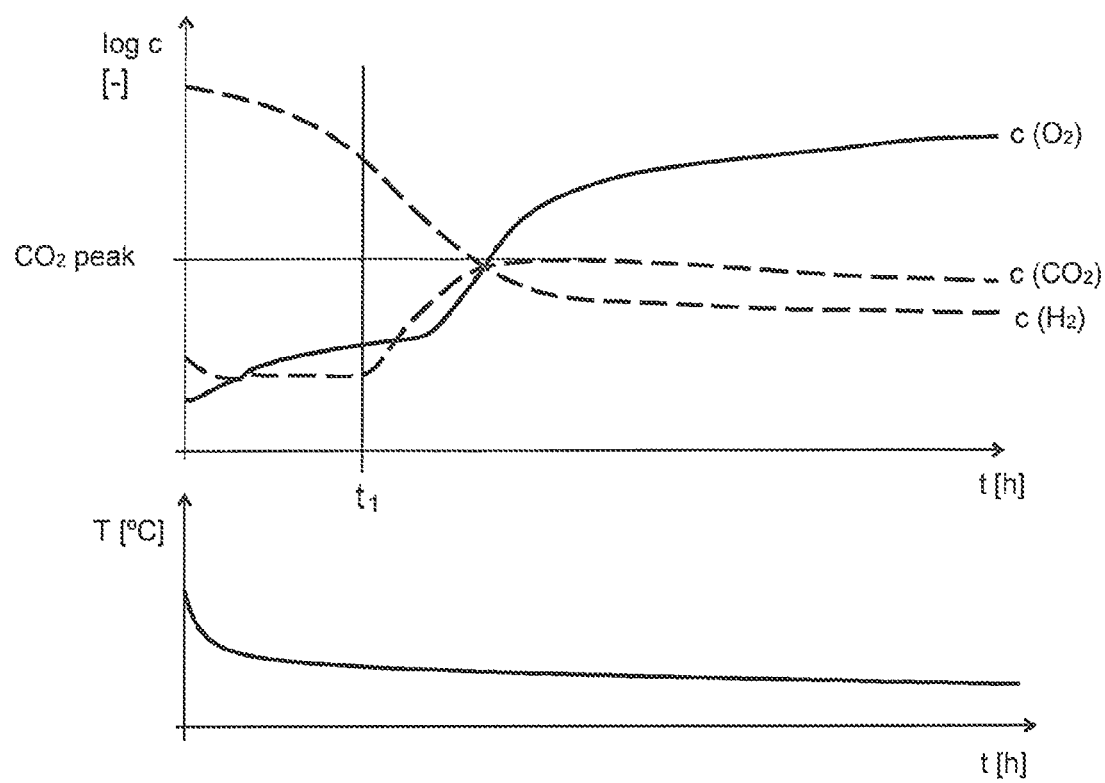

(51) Int. Cl.
*H01M 8/04089* (2016.01)
*H01M 8/0432* (2016.01)
*H01M 8/0444* (2016.01)
*H01M 8/04303* (2016.01)
*H01M 8/04955* (2016.01)

(52) U.S. Cl.
CPC ... *H01M 8/04089* (2013.01); *H01M 8/04303* (2016.02); *H01M 8/04462* (2013.01); *H01M 8/04955* (2013.01); *H01M 2250/20* (2013.01)

(58) Field of Classification Search
CPC ......... H01M 8/04955; H01M 8/04303; H01M 2250/20
USPC .......................................... 429/429
See application file for complete search history.

(56) References Cited

U.S. PATENT DOCUMENTS

| | | | |
|---|---|---|---|
| 2011/0143243 A1 | 6/2011 | Arthur et al. | |
| 2011/0244348 A1 | 10/2011 | Cai et al. | |
| 2012/0077102 A1 | 3/2012 | Morita et al. | |
| 2013/0029239 A1* | 1/2013 | Kang | H01M 8/04303 |
| | | | 429/429 |
| 2013/0323539 A1 | 12/2013 | Furusawa et al. | |
| 2014/0038073 A1 | 2/2014 | Greszler et al. | |
| 2018/0358638 A1* | 12/2018 | Mielke | H01M 8/04303 |

FOREIGN PATENT DOCUMENTS

| | | |
|---|---|---|
| DE | 102009036198 A1 | 2/2011 |
| DE | 102011083327 A1 | 3/2012 |
| DE | 102013210098 A1 | 12/2013 |
| DE | 102017115703 A1 | 1/2018 |
| DE | 102018008794 A1 | 2/2019 |

* cited by examiner

METHOD FOR SHUTTING DOWN A FUEL CELL SYSTEM

The invention relates to a method for shutting down a fuel cell system of the type defined in more detail in the preamble of claim 1.

It is known from the general prior art that the shutdown of fuel cell systems is typically associated with mechanisms that adversely affect the useful life of the fuel cell systems. Essentially, this involves an oxygen-hydrogen front running over the active surface of the fuel cell, which leads to oxidation or corrosion of carbon. This serves, inter alia, as a carrier for the necessary catalysts such as platinum, so that these catalysts are also damaged or eroded. Due to the gradually decreasing amount of catalysts and carbon in the area of the fuel cell, its useful life is adversely affected over the long term. The process is also known as carbon corrosion.

In order to limit carbon corrosion and to extend the useful life of the fuel cell, it is known from the prior art to enclose hydrogen at least on the anode side of the fuel cell stack when it is shut down, in order to create defined conditions during the shutdown and to avoid an oxygen-hydrogen front or air-hydrogen front as a catalyst for carbon corrosion. In this context, reference can be made to DE 10 2007 059 999 A1, inter alia, which also discloses valve devices for this purpose to shut off the cathode area and thereby prevent air or oxygen from flowing in and thus rapid depletion of the hydrogen on the anode side. A solution which can dispense with the valves is described in DE 10 2009 036 198 A1 of the applicant. It too relies on leaving hydrogen in the area of the anode after the fuel cell system has been shut down and thus providing the hydrogen atmosphere through which the harmful processes are avoided for as long as possible. This period of time is also known as the hydrogen protection time.

In order to extend this hydrogen protection time beyond the amount of hydrogen in the fuel cell after it has been shut down and the period of time to be achieved with it, various publications propose adding more hydrogen, for example from time to time or based on other criteria, and thus to maintain the hydrogen atmosphere basically during the entire shutdown of the fuel cell and thus to have the entire shutdown period as hydrogen protection time. In this context, reference can be made purely by way of example to US 2011/0244348 A1, US 2011/0143243 A1 and US 2014/0038073 A1. In all of these publications, the basically constantly repeating subsequent metering of hydrogen results in a relatively high hydrogen consumption, since diffusing air consumes a portion of the hydrogen, and an absolute seal against hydrogen leaks is in principle hardly possible in practice due to the physical properties of hydrogen. This means that in practice, in a vehicle which has such a fuel cell system and which has very long shutdown periods of, for example, several days, the hydrogen consumption can become so great that the tank is empty when the vehicle user returns to the vehicle. This represents a serious disadvantage and is highly undesirable in practice.

A so-called air/air start with air on both the anode side and on the cathode side, however, is not only disadvantageous, especially if the oxygen-hydrogen front, which leads to carbon corrosion, can be prevented from running over the active surface. Otherwise, namely, the oxidation occurring during the air/air start also leads to absorbed impurities being oxidized by the catalyst in the anode chamber and thus ultimately purified. It is therefore definitely advantageous if an air/air start takes place occasionally, but not always, in order to oxidize in particular the CO contamination from operation on the catalyst of the anode chamber. In a regularly operated fuel cell system, such as that of a vehicle, for example, such a start can be advantageous once or twice every one to two weeks. In this context, reference can be made to the publication which goes back to the inventor S. Erbach et al., "Influence of Operating Conditions on Permeation of $CO_2$ through the Membrane in an Automotive PEMFC System," International Journal of Hydrogen Energy (2018) 1-12.

As regards the further general prior art, it is also known from the field of shutting down fuel cell systems that liquid is condensed in the fuel cell system before the fuel cell system is flushed with air, for example. This has no relation to carbon corrosion, but serves to prevent the fuel cell itself and relevant system aspects from freezing. In order to promote condensation after the fuel cell system has been shut down, it is actively cooled, for example, as described in DE 10 2017 115 703 A1.

The object of the present invention is now to provide an improved method for shutting down a fuel cell system having the features in the preamble of claim 1, which minimizes the disadvantages occurring in the prior art and ensures a long useful life for the fuel cell in the actually occurring operation of a fuel cell system, in particular a fuel cell system in a vehicle.

According to the invention, this object is achieved by a method having the features in claim 1. Advantageous configurations and developments can be found in the sub-claims dependent thereon.

The inventor has recognized that carbon dioxide on the exhaust air side of the cathode chamber and on the exhaust gas side of the anode chamber can be used as a measure for the occurrence of carbon corrosion. With this knowledge, he has developed a strategy to ensure the best possible hydrogen protection time and ultimately an optimized useful life of the fuel cell with a correspondingly careful use of the resource hydrogen and correspondingly low hydrogen emissions to the environment. In doing so, they have arrived at the method according to the invention, which, comparable to the methods in the prior art, leaves hydrogen in the anode chamber of the fuel cell after it has been shut down, and which, if necessary, subsequently meters hydrogen into the anode chamber at least once to further prevent carbon corrosion when the hydrogen in the anode chamber is largely consumed. According to the invention, it is now the case in the method that after a predetermined number of subsequent meterings, the hydrogen protection time is actively terminated in that the cathode chamber is actively exposed to air. The method according to the invention therefore uses the findings from the prior art in order to maintain a hydrogen protection time over a first period of time as needed. For example, by leaving hydrogen in the anode chamber when the fuel cell is shut down, a hydrogen protection time on the order of magnitude of up to 10 hours can be achieved. If a subsequent metering of hydrogen is then made, the hydrogen protection time can be extended again by a few hours, for example by approximately 5 to 7 hours. The times depend on the size and construction of the fuel cell and the fuel cell system, as they are related to the corresponding volumes and the number of interfaces and thus the points at which the hydrogen has to be sealed off. The numerical values are therefore purely exemplary and should be understood as rough guide values for explaining the idea.

In practice, it is the case that fuel cell systems, in particular fuel cell systems which are used in vehicles, are typically used in such a way that the vehicle is moved practically every day, for example during the week. Between the individual periods of use of the vehicle, there are typically periods of time which are less than 15 hours, which can usually be completely covered by the hydrogen protection time with one subsequent metering. For example, when the vehicle is parked in the company parking lot while its owner is at work, to which it was moved in the morning and from which it is moved back home in the evening. It is often the case that the vehicle is used again at the end of the day. In practice, the vehicle is then parked in the maximum case from the end of the work of the user, for example 4:00 p.m., until he leaves for work the next morning at 7:00 a.m. The period of time thus equals about 15 hours and can generally be bridged with one subsequent metering of hydrogen, so that the hydrogen protection time is available during the entire shutdown and carbon corrosion can be completely avoided. The time can be learned, for example, through a recording system of the times of use of the vehicle in connection with the days and times of the week, so that it can be decided on the basis of this learned behavior whether typically one or, for example, two subsequent meterings are to be made in order to maintain the hydrogen protection time continuously during normal operation of the vehicle.

As mentioned at the outset, it can make sense to carry out an air/air start from time to time, so that in this case a subsequent metering of hydrogen can also be dispensed with entirely. This can be implemented, for example, using a counter that counts the number of starts within the hydrogen protection time and reduces the number of subsequent meterings to zero above a certain predetermined value in order to achieve an air/air start every one to two weeks, for example.

If a deliberate air/air start is planned or the vehicle is parked longer than usual, the hydrogen protection time is actively terminated. For example, if the vehicle is parked for more than 18 or 20 hours and the normal vehicle shutdown period has been realized completely in a hydrogen atmosphere with one or two subsequent meterings. The extended parking duration of the vehicle then indicates that it is, for example, the weekend and the vehicle is not being used, that the user of the vehicle is on vacation and therefore does not need the vehicle or the like. At this point, the hydrogen protection time can then be actively terminated, for example, in a time-controlled manner or as a function of parameters of the fuel cell system which indicate the end of the hydrogen protection time, for example of the first subsequent metering. The fuel cell system is cooled down before the hydrogen protection time is actively terminated. This is particularly useful if the period of time until the resulting or actively desired air/air start was not overly long. The fuel cell system itself, which operates at a relatively high operating temperature of 70-90° C., for example, cools down slowly, especially if the hydrogen atmosphere inside is to be maintained and convection processes are therefore largely prevented. The inventor has now ascertained that the degree of carbon corrosion correlates with the temperature of the fuel cell, though. The higher the temperature, the higher the peak of measured $CO_2$ with an air/air start of the fuel cell. The active cooling can ensure that the temperature of the fuel cell system is as low as possible when the air crossover starts. This leads to a further improvement in the useful life of the fuel cell.

Such an active termination of the hydrogen protection time, in particular at a system temperature of 20° C. or less, breaks through the harmful processes that normally occur in that there is an active air supply to the cathode chamber. The hydrogen protection time is therefore ended deliberately, namely through the active supply of oxygen within a relatively short period of time in which the oxygen content increases. This is because the investigations and measured values of the inventors have shown in practice that the methods according to the prior art, without a subsequent metering of hydrogen or with one or more subsequent meterings of hydrogen which are terminated at some point, have always led to approximately comparable carbon corrosion. On the fuel cell stacks used for the investigations, the maximum $CO_2$ formation reached a value of approximately 4,000 to 4,500 ppm, which of course depends on the size and construction of the fuel cell stack. With the method according to the invention, which actively terminates the hydrogen protection time after the at least one first subsequent metering, the inventors were able to achieve a very rapid exchange of the gases, so that carbon corrosion could be significantly reduced. With the same fuel cell stack in which carbon dioxide values on the order of magnitude of 4,000 to 4,500 ppm were measured when the hydrogen protection time expired independently, an active termination of the hydrogen protection time and a fuel cell system which, after active cooling, had a system temperature of less than approximately 20° C., carbon dioxide levels from 900 to 1,200 ppm could be measured. The carbon corrosion that occurred can thus be reduced by approximately a factor of 4 by actively terminating the hydrogen protection state compared to its passive expiry.

In practice, the method according to the invention enables, for example, by a small number of one or two subsequent meterings while economically using the resource hydrogen in many phases, to maintain the hydrogen protection time over the entire shutdown phase of the fuel cell system, which is to be used in a vehicle in particular. If longer shutdown periods occur, for example on weekends, on vacation or the like, the hydrogen protection state in the actively cooled fuel cell system is terminated without or after a predetermined number of subsequent meterings and the cathode chamber is exposed to air. This means that a certain amount of carbon corrosion is accepted. The investigations have shown, however, that when the hydrogen protection time is actively terminated and the fuel cell system has previously been actively cooled, the carbon corrosion corrodes much less carbon than when the hydrogen protection time expires passively, so that overall a clear advantage can still be achieved with respect to the useful life, especially proportionally to the difference in the amount of carbon dioxide produced.

According to an advantageous development of the method in accordance with the invention, the active cooling takes place until either a predetermined temperature limit value has been fallen below and/or a predetermined period of time has elapsed. Such a temperature value can, for example, be specified in the order of magnitude of 20° C., as already indicated above. If the ambient temperature does not allow such a strong cooling, for example, because the surrounding area is 30° or 35° C., the active cooling can also be terminated after a predetermined period of time and the lowest possible temperature that can thus be achieved depending on the ambient temperature. In this case, a slightly higher level of carbon corrosion must be accepted, but this cannot readily be avoided due to the ambient temperature.

According to a further advantageous embodiment of the idea, it can also be provided that the specified temperature limit value and/or the period of time is specified as a function of the ambient temperature or also an expected ambient temperature at the time of active ventilation. If it is foreseeable that the ambient temperature will drop, for example because it is already evening and active ventilation will presumably only take place at night, or because corresponding meteorological forecasts suggest a drop in temperature, this can be taken into account in the specified temperature limit value or the period of time.

When the fuel cell system is used in a vehicle, it can furthermore be provided according to an advantageous development of the method in accordance with the invention that the active cooling takes place after the vehicle has been parked. The vehicle can then be used to its full extent until it is parked, while the active cooling only takes place after the vehicle has been parked in order to prepare the active ventilation that occurs later accordingly or, if necessary, to terminate the hydrogen protection time.

Another very favorable embodiment also provides that when the fuel cell system is used together with an electrical energy store in a vehicle, the active cooling of the method according to the invention already takes place before the vehicle is parked when it approaches a destination. The vehicle is then supplied with the power required for propulsion and the like from the electrical energy store while the fuel cell system is cooling. The fuel cell system in the vehicle can thus be cooled very energy-efficiently with the aid of the airstream that is available anyway.

A very advantageous further development of this variant of the method according to the invention provides that an approach to a destination is recognized via a navigation system, with programmed or learned destinations being used. In the last driving section before this destination is reached, in particular a predefined time period before the expected arrival, the fuel cell, which then no longer actively delivers any power, can then be actively cooled. The drive takes place with power from the electrical energy store.

An extremely favorable development of this idea also provides that the active cooling is planned in the last section of the journey before the destination, while the electrical energy store is charged by the fuel cell in a penultimate section of the journey, i.e. before the active cooling takes place. If it is known that active cooling of the fuel cell takes, for example, 15-20 minutes, then, for example, the active charging of the electrical energy store device to its highest state of charge can start in a period of approximately 45 minutes before arrival at the destination, so that it is then fully charged approximately 15-20 minutes before reaching the destination. The maximum energy is now available in the electrical energy store and the fuel cell system or the fuel cell can be deactivated and actively cooled. When the destination is reached, the fuel cell is already at a correspondingly low temperature in order to achieve the lowest possible carbon corrosion in the event that the hydrogen protection time has to be actively terminated.

An extremely favorable embodiment of the method according to the invention now provides that the number of subsequent meterings, as already mentioned above, is specified as a function of a counter which counts the number of starts without active ventilation of the cathode chamber. By specifying the count variable, this makes it possible to force an air/air start at least from time to time in order to purify the catalyst of the anode chamber in the manner described above. If an air/air start is carried out due to other conditions such as a correspondingly long shutdown period or the like, the counter is reset so that no unnecessary air/air starts have to be carried out, which would in turn have an adverse effect on the useful life of the fuel cell in the event of an occurrence of a correspondingly large number thereof.

As an alternative or in addition to this, according to a very advantageous further development of the idea, provision can also be made for the number of subsequent meterings to be specified as a function of the ambient temperature or on the basis of the ambient temperature profile to be expected. If the ambient temperature is currently very high and active cooling below a threshold value of 20° C., for example, is hardly possible, the hydrogen protection time can be extended accordingly by means of a subsequent metering or further subsequent metering. This is particularly useful if an expected temperature profile, which can be derived, for example, from the time from learned temperature conditions, or from a meteorological forecast, enables improved cooling at a later point in time. If it is evening, for example, there may be a delay until late at night before actively cooling the fuel cell and actively terminating the hydrogen protection time. In this case, a lower ambient temperature and thus the possibility of greater cooling of the fuel cell by the active cooling is to be expected. Even in the case of a temperature profile towards lower ambient temperatures that can be recognized on the basis of a meteorological forecast, a further subsequent metering may be useful in order to achieve such an effect.

As a further supplementary or alternative possibility to determine the number of subsequent meterings, for example in the order of magnitude between zero and three subsequent meterings, the expected shutdown period can also be dependent on the destination, the time, the date and/or a calendar entry. As already mentioned at the beginning, it is the case, for example, that longer shutdown periods typically occur on weekends. If the vehicle is parked at home on the weekend, for example, the number of subsequent meterings can be reduced accordingly, especially if the counter is already relatively high at the same time in order to achieve an air/air start that is already desired or at least necessary soon. In addition to the time and date, calendar entries can also be taken into account. If the vehicle is parked at the airport, for example, and a business trip or vacation is noted in the calendar, it can also be assumed that there will be a longer shutdown period, so that the consumption of hydrogen by means of subsequent metering is dispensed with and the hydrogen protection time is actively terminated relatively quickly after cooling down.

Further advantageous refinements and developments of the method also result from the exemplary embodiment, which is explained in more detail below with reference to the figures.

Figure 2:
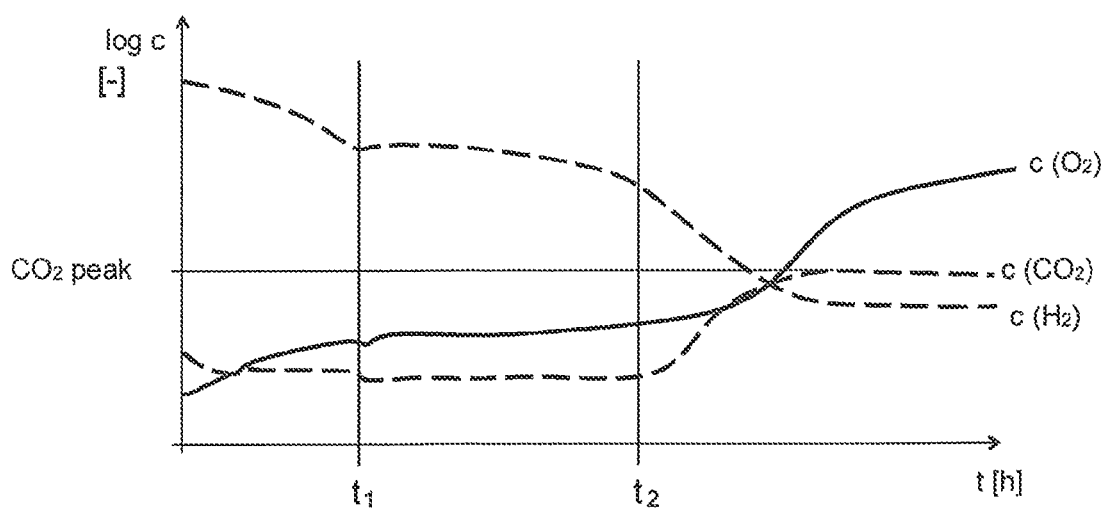
Figure 3:
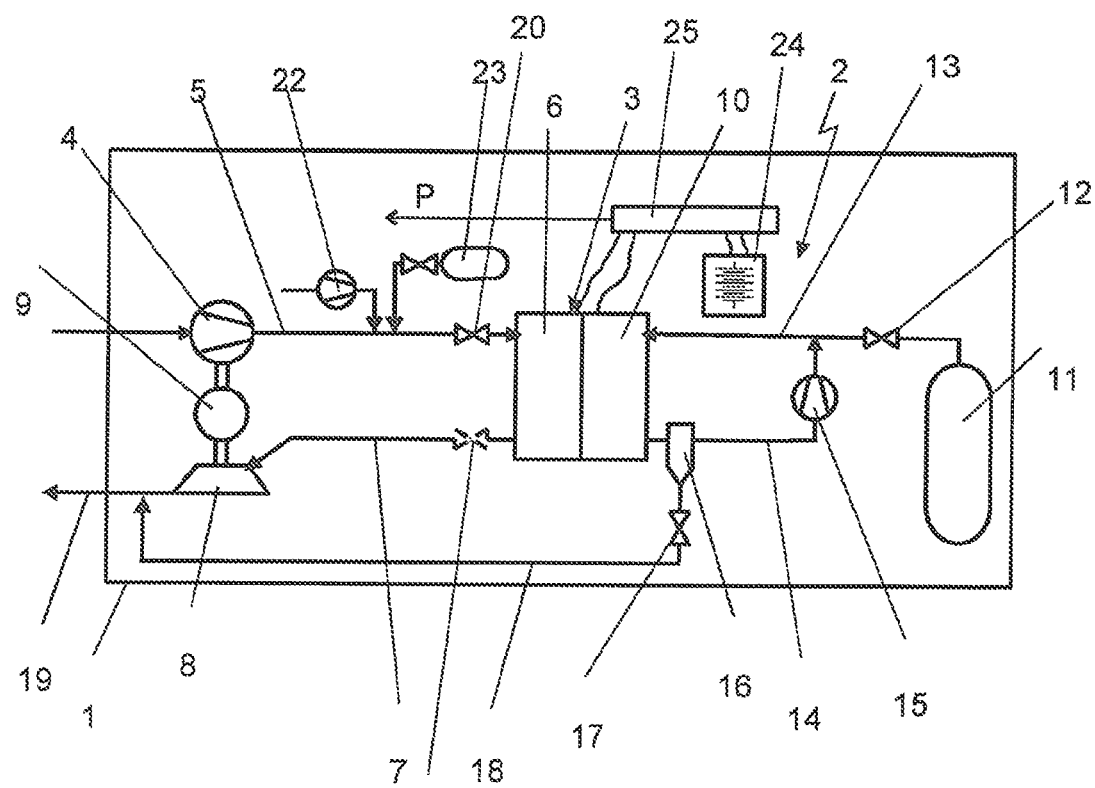
Figure 4:
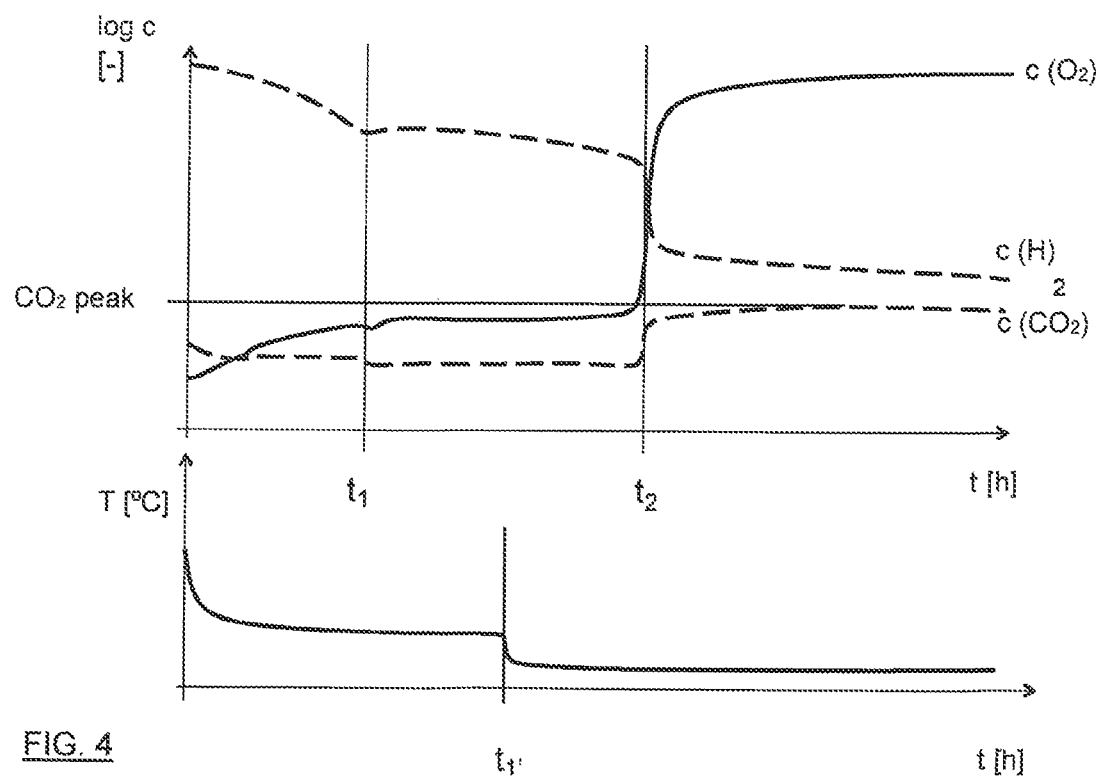
Figure 5:
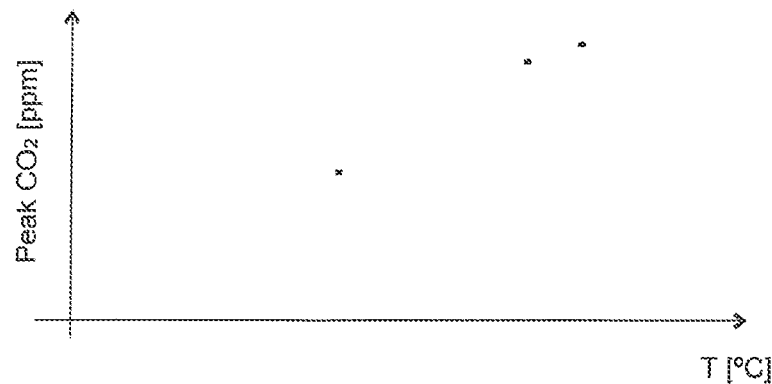

These show:

FIG. 1 a graph of the concentrations over time in a first method according to the prior art;

FIG. 2 a graph of the concentrations over time in a second method according to the prior art;

FIG. 3 an exemplary fuel cell system which is suitable for carrying out the method according to the invention; and FIG. 4 a graph of the concentrations over time in a method according to the invention;

FIG. 5 a graph of measured carbon dioxide peak values over temperature; and

Figure 6:
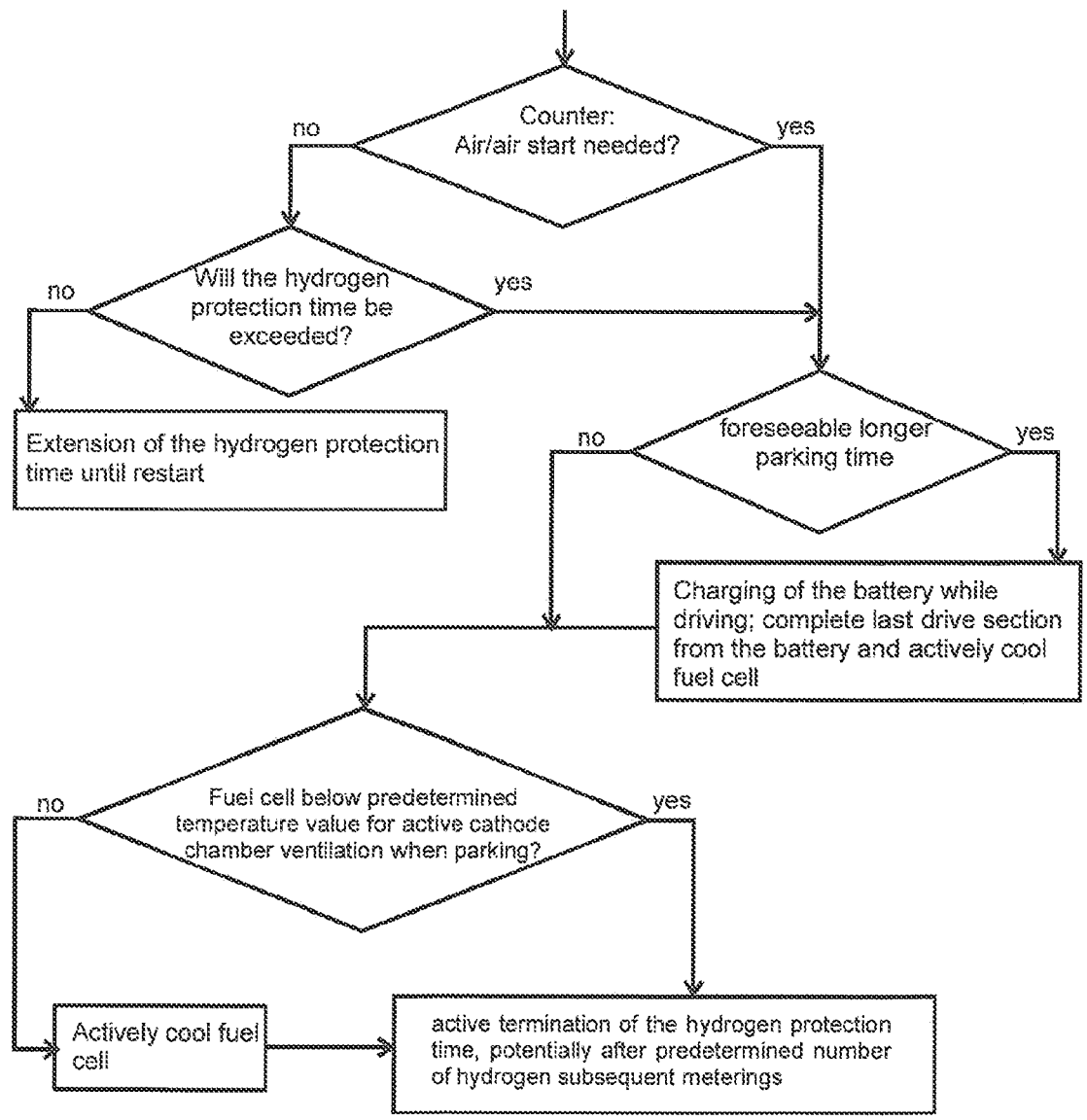

FIG. 6 a flow chart of a possible embodiment of the method according to the invention.

FIGS. 1 and 2 show the methods according to the prior art. FIG. 1 shows a graph of different concentrations c, which are plotted logarithmically on the y-axis, specifically over time t in hours on the x-axis. The solid line $c(O_2)$ stands for the oxygen concentration in the fuel cell, the dash-dotted line $c(H_2)$ for the hydrogen concentration. In order to record the cathode corrosion, the dashed line 3 also shows the concentration c($CO_2$). The method in the illustration of FIG. 1 essentially corresponds to the method described in the prior art mentioned at the outset, in which the hydrogen is only enclosed in the anode chamber and, initially, no additional hydrogen subsequent metering takes place. This method can be used to achieve a hydrogen protection time up to the point in time $t_1$, which is on the order of magnitude of approximately 10 hours, for example. After that, the concentration of carbon dioxide increases accordingly, which is an indication of increased carbon corrosion. The maximum $CO_2$ peak value is around 4,200 ppm in the graph shown here. The fuel cell can cool down during the hydrogen protection time up to time $t_1$. The cooling behavior is shown in the illustration of FIG. 1 below by the temperature T plotted over the same time axis t. The temperature can be, for example, the inlet temperature into the anode chamber. The differences are minimal, the quantitative behavior of all temperature curves measured in the fuel cell system or the fuel cell is essentially the same. The cooling takes place relatively quickly at first, and then very slowly thereafter. The system will therefore remain at a temperature of, for example, 30-35° C. for a very long period of time, for example when the vehicle is parked in a garage.

During the hydrogen protection time, air-hydrogen fronts are prevented by the excess pressure of hydrogen in the anode, and hydrogen can diffuse to the cathode. A positive side effect is that the hydrogen in the cathode chamber can reduce platinum oxide produced during operation and thus expose the catalyst surface in the cathode chamber again. If the hydrogen is largely consumed, the hydrogen protection time ends at time $t_1$, since the hydrogen has, for example, escaped through leaks or has reacted with oxygen to form water. In this phase, there is now a passive transition from the hydrogen protection time to the subsequent time, during which in-plane currents form in the surface along the electrolyte membrane and slowly corrode the carbon carrier of the platinum catalyst and thus adversely affect the useful life of the fuel cell. In this phase, a maximum carbon dioxide concentration of approximately 4,200 ppm is recorded as a measure of the carbon corrosion that has occurred.

Nevertheless, there are positive side effects even in this phase. Oxygen that enters into the anode chamber not only causes corrosion there, but can also oxidize absorbed impurities and thus expose the surface of the catalyst in the anode chamber again.

The illustration of FIG. 2, which also shows a method according to the prior art and which uses the same division of the axes, shows the method in which a subsequent metering of hydrogen is made at time $t_1$. The hydrogen protection time is thus extended until time $t_2$. Between the times $t_1$ and $t_2$, the fuel cell can cool down further and is also protected from the corrosive potentials, in particular at elevated temperatures of the fuel cell, by the subsequently metered hydrogen. Here, too, air-hydrogen fronts are further prevented by the excess pressure of hydrogen, so that overall shutdown periods up to time $t_2$ in the order of magnitude of 10 to 20 hours, for example approximately 14 to 16 hours, are possible before the formation of carbon dioxide, shown here again in dashed lines, suggests increasing carbon corrosion. As long as the restart of the fuel cell takes place within the period of time up to the point in time $t_2$, this method is well-suited to effect a start that is protective of the useful life of the fuel cell by restarting within the hydrogen protection time. If not, a passive end of the hydrogen protection time occurs from time $t_2$ onwards, comparable to the graph in FIG. 1 from time $t_1$ onwards, and thus the feared carbon corrosion, which can again be measured here by a $CO_2$ peak on the order of magnitude of approximately 4,200 ppm, this value representing a measure of the carbon corrosion that has occurred.

In the illustration of FIG. 3, a schematically indicated vehicle 1 is shown, which is to receive its electrical drive energy via a fuel cell system 2, likewise shown schematically. The core of the fuel cell system 2 is formed by a fuel cell 3, which is constructed as a stack of individual cells using PEM technology, a so-called fuel cell stack. Each of the individual cells comprises a cathode chamber 6 and an anode chamber 10, which are designed to be separated from one another by means of corresponding flow fields and gas distributors as well as an electrolyte membrane. Air is supplied to the cathode chamber 6 as an oxygen supplier via an air conveying device 4 and an air supply line 5. Unused exhaust air reaches the environment in regular operation via an exhaust air line 7 and an exhaust air turbine 8. In the exhaust air turbine 8, part of the pressure and thermal energy in the exhaust air is recovered. The exhaust air turbine 8 is in operative connection with the air conveying device 4 in order to drive it in a supporting manner. An electric machine 9, which is likewise in operative connection with the exhaust air turbine 8 and the air conveying device 4, can now be used on the one hand to drive the air conveying device 4, in particular to deliver the supporting drive power when the exhaust air turbine 8 does not deliver sufficient power, which will be the normal operating case. If there is an excess of power at the exhaust air turbine 8, the electric machine 9 can also be operated as a generator.

Hydrogen is fed to the anode chamber 10, which, in the exemplary embodiment shown here, flows from a pressurized gas reservoir designated 11 via a pressure regulating and metering valve 12 and a hydrogen feed line 13 to the anode chamber 10. Hydrogen that has not been consumed reaches the hydrogen feed line 13 via a recirculation line 14 and a recirculation conveying device 15, which is designed here as a fan, and is fed back to the anode chamber 10, mixed with fresh hydrogen. This structure is known from the prior art and is referred to as the anode circuit. As an alternative to the fan shown here, the recirculation conveying device 15 can also be designed as a gas jet pump or as a combination of a fan and a gas jet pump.

Over time, water and inert gas collect in the anode circuit. The water is separated off via a water separator 16. Via a valve device 17, the water and inert gas that has accumulated in the anode circuit can be drained off via a drain line 18, for example from time to time or depending on the hydrogen concentration in the anode circuit. The exhaust gas laden with the water passes after the exhaust air turbine 8 into the part of the exhaust air line 19 there. This structure is known from the prior art, also with regard to its functionality. In practice, it will include additional components such as an intercooler, a humidifier or the like. These are of secondary importance for an understanding of the present invention and are therefore not shown. Nevertheless, they can be present accordingly, as those skilled in the art of fuel cell systems will appreciate.

A valve device 20, 21 is arranged in the supply air line 5 as well as optionally in the exhaust air line 7. Via these, the cathode chamber 6 can, if necessary, be blocked from a flow of air, in particular when the fuel cell system 2 is shut down. Preferably, only the valve device 20 is present in the supply air line 5, since this is less critical with regard to freezing.

In the illustration of FIG. 3, an electrical energy store 24 is also indicated in the vehicle 1, for example a battery. Like the fuel cell 3, this is electrically connected to power electronics 25, which supply the required electrical power P to the vehicle 1 in order to drive the vehicle 1 and to cover the energy requirements of secondary consumers.

In the illustration of FIG. 4, the sequence of the method according to the invention can again be seen in a graph with logarithmically plotted concentrations over the time t plotted in hours and the temperature curve T plotted below it over time t. The sections up to time $t_1$ correspond to those of FIG. 1, the section up to time $t_2$ to that of FIG. 2 and thus to the prior art. A special process now starts at time $t_2$. Instead of a further subsequent metering of hydrogen, which would also be conceivable here once or twice, there is an active termination of the hydrogen protection time. For this purpose, the cathode chamber 6, which was previously blocked via the valve device 20 or, if present, via the valve device 20 and 21, is actively ventilated. The valve device 20 and 21 is opened for this purpose. The air conveying device 4 can in principle be operated in order to ventilate the cathode chamber 6 accordingly and to supply it with oxygen in order to actively terminate the hydrogen protection time. In order to be able to dispense with the operation of the relatively complex air conveying device 4 designed, for example, as a flow compressor, a fan 22 and/or a compressed air reservoir 23 can optionally be provided as an alternative. These are also suitable for ventilating the cathode chamber 6 at time $t_2$ and thus actively terminating the hydrogen protection time.

Before the hydrogen protection time is actively terminated, the fuel cell system 2 or the fuel cell 3 is actively cooled. This can be seen from the temperature curve in FIG. 4 at the bottom: At point in time $t_{1'}$, there is an active cooling, for example from a temperature level in the order of magnitude of 35° C. to a temperature level below 20° C. The active cooling of at least the fuel cell 3 of the fuel cell system 2 thus takes place before the termination of the hydrogen protection time. It can also take place much earlier, for example directly after parking or even before the vehicle 1 is parked. For this purpose, the vehicle 1 can be operated with energy from the battery or the electrical energy store 24, while the then inactive fuel cell 3 is cooled down. In order to prepare for this and to ensure a sufficient energy content of the electrical energy store 24, a full charge of the electrical energy store 24 can take place, for example, depending on a programmed or learned destination and the current position of the vehicle 1, which can be determined via GPS, for example in a navigation system, in order to then to have sufficient energy to supply the vehicle 1 with power P and to actively cool the fuel cell 3.

As can be seen in the graph in FIG. 4, this active termination causes a significant increase in the oxygen concentration according to the solid line with a simultaneous decrease in the hydrogen concentration according to the dash-dotted line. Here, too, carbon corrosion inevitably occurs, as indicated by the concentration of carbon dioxide with the dashed line. However, it is now recognizable, although the logarithmic scaling of the y-axis makes it much less visible than it would be with a linear representation, that the maximum amount of carbon dioxide, i.e. the $CO_2$ peak, is significantly lower than with the prior art methods shown in FIGS. 1 and 2. This would already be the case even without active cooling of the fuel cell 3, as is known from the German patent application 10 2018 008794.9, which was not previously published.

By actively cooling the fuel cell 3, this $CO_2$ peak can be reduced even further. The measured $CO_2$ peak depends on the temperature of the fuel cell 3. The graph shown in FIG. 5 shows, by way of example, three measured values of the $CO_2$ peak using the example of a method according to FIG. 1 at different temperatures of 20° C., 35° C. and 40° C., for example. The $CO_2$ peak is reduced from the above-mentioned values in the order of magnitude of 4200 ppm at 40° C. to approximately 4000 ppm at 35° C. and ultimately to less than 3000 ppm at 20° C. If the active termination of the hydrogen protection time is now combined with a previous cooling of the fuel cell 3, this then leads to a further significant reduction in the $CO_2$ peak when the hydrogen protection time is actively terminated.

Measured on the same fuel cell stack on which the test values in FIGS. 1 and 2 are based, the $CO_2$ peak here without active cooling equaled approximately 1,100 ppm, and with active cooling only approximately 800 to 900 ppm, i.e. on the order of magnitude of less than a quarter of the $CO_2$ peak in the prior art methods. By actively terminating the hydrogen protection time, carbon corrosion can thus be significantly reduced.

For this purpose, a gas exchange is actively carried out in the cathode chamber 6 at point in time $t_2$, in that it is correspondingly ventilated, for example, via a small fan 22 that can be operated from the starter battery. This gas exchange then also leads to a change in the anode chamber 10 through permeation, as a result of which oxygen-hydrogen fronts, which slowly develop, are avoided. By avoiding the slowly developing oxygen-hydrogen fronts or air-hydrogen fronts, the high level of carbon corrosion from the passive termination of the hydrogen protection time can be significantly reduced, which is a decisive advantage, especially if, as mentioned above, the active termination does not take place in every shutdown period of the fuel cell system 2 or of the vehicle 1, but only if the restart was not carried out within the hydrogen protection time that can be provided with a few subsequent meterings.

As already mentioned, however, an air/air start from time to time, especially if it can take place without a critical, slowly developing oxygen-hydrogen front, can be advantageous in order to remove contamination such as, for example, accumulated carbon monoxide from the catalyst of the anode chamber 10. For this reason, a counter can be used by means of which the number of starts without active ventilation of the cathode chamber 6, that is to say without an actively terminated hydrogen protection time, is captured. After a specified number of times, the subsequent metering can be stopped or the number reduced in order to achieve an air/air start that is desired in this case. In addition, the temperature is taken into account accordingly here, so that the air/air start, regardless of whether it is desired or if the hydrogen protection time is terminated after (repeated) subsequent metering, can take place at a low temperature and with a previously cooled fuel cell system 2.

One possibility for implementing the method accordingly therefore results from the flowchart shown in FIG. 6. If such a counter is available, the count variable is used to determine whether an air/air start is necessary or not. If this is not the case, it is checked whether the hydrogen protection time is likely to be exceeded, which can be estimated, for example based on the location, learned parking times, the times of day, calendar entries of the vehicle user or the like. If this is not the case, the hydrogen protection time is extended until the restart, if necessary, also by a higher number of hydrogen subsequent meterings.

If it is to be expected that the hydrogen protection time will be exceeded, it is checked in the same manner as in the case of an affirmed air/air start whether a longer parking time is planned. If this is the case, the battery is charged while driving, especially in the penultimate section of the drive. In the last section of the drive, the electrical energy store 24, for example a battery, is then used as the only source for the power P of the vehicle 1 and the passively switched fuel cell 3 is actively cooled. If a longer parking period is not foreseen, this step is saved. After shutdown, it is then checked whether the fuel cell 3 is below the predetermined temperature value for active cathode chamber ventilation when it is shut down. If this is the case, no further cooling has to take place and the active termination of the hydrogen protection time is initiated, if necessary, after a predetermined number of hydrogen subsequent meterings. If this is not the case, the fuel cell is actively cooled again beforehand in order to ensure that the temperature of the fuel cell 3 is as low as possible for the active termination of the hydrogen protection time that then takes place.

The invention claimed is:

1. A method for shutting down a fuel cell system (2) having at least one fuel cell (3), which fuel cell comprises an anode chamber (10) and a cathode chamber (6), the method comprising
   shutting down the fuel cell system (2) wherein after the shutting down hydrogen is left in the anode chamber (10) of the fuel cell (3) and is used in order to prevent carbon corrosion and to ensure a hydrogen protection time,
   actively terminating the hydrogen protection time by actively admitting air into the cathode chamber (6) before the hydrogen in the anode chamber (10) is completely used up directly or after a specified number of subsequent meterings of hydrogen at least into the anode chamber (10),
   wherein the fuel cell (3) is actively cooled before air is actively admitted into the cathode chamber (6),
   wherein the active cooling takes place until a system temperature falls below a predetermined system temperature limit value and/or a predetermined period of time has elapsed, and
   wherein a predetermined system temperature limit value and/or the period of time are predetermined as a function of the ambient temperature or an expected ambient temperature at the time of active ventilation.

2. The method according to claim 1, wherein the fuel cell system (2) is used in a vehicle (1), wherein the active cooling takes place after the vehicle (1) has been parked.

3. A method for shutting down a fuel cell system (2) having at least one fuel cell (3), which fuel cell comprises an anode chamber (10) and a cathode chamber (6), the method comprising
   shutting down the fuel cell system (2) wherein after the shutting down hydrogen is left in the anode chamber (10) of the fuel cell (3) and is used in order to prevent carbon corrosion and to ensure a hydrogen protection time,
   actively terminating the hydrogen protection time by actively admitting air into the cathode chamber (6) before the hydrogen in the anode chamber (10) is completely used up directly or after a specified number of subsequent meterings of hydrogen at least into the anode chamber (10),
   wherein the fuel cell (3) is actively cooled before air is actively admitted into the cathode chamber (6), and
   wherein the fuel cell system (2) is used in a vehicle (1) together with an electrical energy store (24), wherein the active cooling takes place before the vehicle (1) is parked when it approaches a destination, the vehicle (1) being supplied with power from the electrical energy store (24) during cooling.

4. The method according to claim 3, wherein an approach to a destination is detected via a navigation system, wherein programmed or learned destinations are used.

5. The method according to claim 3, wherein before the active cooling takes place, the electrical energy store (24) is charged by the fuel cell (3).

6. The method according to claim 1, wherein the number of subsequent meterings is specified as a function of a counter which counts the number of starts without active ventilation of the cathode chamber (6).

7. The method according to claim 1, wherein the number of subsequent meterings is predetermined depending on the ambient temperature or on the basis of an expected variation in the ambient temperature over time.

8. A method according to claim 2, wherein the number of subsequent meterings is predetermined as a function of the expected parking time, the expected parking time being estimated as a function of the destination, the time, the date and/or taking into account the vehicle user's calendar entries.

9. The method according to claim 1, wherein the active cooling commences when a system temperature drops to 35° C.

10. The method according to claim 1, wherein the active cooling takes place until a system temperature drops to 20° C.

11. The method according to claim 1, wherein the active cooling takes place when a system temperature reaches ambient temperature.

12. A method for shutting down a fuel cell system (2) having at least one fuel cell (3), which fuel cell comprises an anode chamber (10) and a cathode chamber (6), the method comprising
   shutting down the fuel cell system (2) wherein after the shutting down hydrogen is left in the anode chamber (10) of the fuel cell (3) and is used in order to prevent carbon corrosion and to ensure a hydrogen protection time,
   actively terminating the hydrogen protection time by actively admitting air into the cathode chamber (6) before the hydrogen in the anode chamber (10) is completely used up directly or after a specified number of subsequent meterings of hydrogen at least into the anode chamber (10),
   wherein the fuel cell (3) is actively cooled before air is actively admitted into the cathode chamber (6), and
   wherein the active cooling commences at a time 10-15 hours after system shutdown.

13. The method according to claim 1, wherein the active cooling takes place prior to the end of the hydrogen protection time.

* * * * *